(12) United States Patent
Ramanathan (10) Patent No.: US 8,146,012 B2
(45) Date of Patent: Mar. 27, 2012

(54) METHOD AND SYSTEM FOR NAVIGATING WEB SITES

(75) Inventor: Krishnan Ramanathan, Kamataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 269 days.

(21) Appl. No.: 12/614,453

(22) Filed: Nov. 9, 2009

(65) Prior Publication Data

US 2011/0061026 A1 Mar. 10, 2011

(30) Foreign Application Priority Data

Sep. 4, 2009 (IN) .......................... 2143/CHE/2009

(51) Int. Cl.
*G06F 3/00* (2006.01)
*G06F 3/048* (2006.01)

(52) U.S. Cl. .................. 715/783; 715/760; 715/776

(58) Field of Classification Search .................. 715/783, 715/760, 776
See application file for complete search history.

(56) References Cited

U.S. PATENT DOCUMENTS

| | | | | |
|---|---|---|---|---|
| 6,028,600 | A * | 2/2000 | Rosin et al. | 715/718 |
| 6,957,398 | B1 * | 10/2005 | Nayeri | 715/867 |
| 6,993,531 | B1 * | 1/2006 | Naas | 1/1 |
| 7,353,234 | B2 * | 4/2008 | Kimball et al. | 1/1 |
| 8,020,106 | B2 * | 9/2011 | Diab et al. | 715/760 |
| 2007/0276811 | A1 * | 11/2007 | Rosen | 707/3 |
| 2009/0303676 | A1 * | 12/2009 | Behar et al. | 361/679.27 |
| 2010/0306702 | A1 * | 12/2010 | Warner | 715/811 |
| 2011/0208732 | A1 * | 8/2011 | Melton et al. | 707/728 |

OTHER PUBLICATIONS

Open Directory—Business: Electronics and Electrical Engineering—http://www.dmoz.org/Business/Electronics_and_Electrical/Engineering/.
The Ultimate Discovery Tool, SimilarWeb; http://www.similarweb.com.
Discover the Best of the Web: StumbleUpon; http://www.stumbleupon.com/.

* cited by examiner

*Primary Examiner* — William Bashore
*Assistant Examiner* — David Phantana Angkool (57) ABSTRACT

Presented is a method and system for navigating web sites. The method includes organizing web sites accessed by a user into a plurality of groups and generating a radio-like interface for selecting at least one web site from the web sites organized into the plurality of groups.

16 Claims, 6 Drawing Sheets

METHOD AND SYSTEM FOR NAVIGATING WEB SITES

RELATED APPLICATIONS

Benefit is claimed under 35 U.S.C. 119(a)-(d) to Foreign application Serial No. 2143/CHE/2009 entitled "Method And System For Navigating Web Sites" by Hewlett-Packard Development Company, L.P., filed on 4 Sep., 2009, which is herein incorporated in its entirety by reference for all purposes.

BACKGROUND

Most computer users are familiar with the internet and web site navigation. The most common way for a user to access a web site on the internet is to type its address in a browser's address toolbar. However, it is difficult for a user to remember each web site's address that a user may wish to access again in future. Web browsers such as Internet Explorer and Mozilla Firefox allow a user to re-access a web site visited earlier by providing a listbox at the end of the address tool bar. Another option for re-accessing a web site is to use the "Bookmarks" or "Favorites" options provided by these web browsers.

However, with thousands of web sites getting added every day and internet search emerging as a useful and convenient solution for discovering newer web sites, it is becoming fairly common for a user to have his or her list of favorite web sites. Also, it is not uncommon to find a user preferring to visit a web site belonging to a particular genre more frequently than other web sites. For example, a user may visit a particular stock web site more often than other stock web sites. Presently a user has limited options for organizing and navigating web sites frequently accessed by him or her.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Common web browsers provide limited options to a user for organizing and navigating web sites. The "Bookmarks" or "Favorites" options provided by some commonly used web browsers have limited features for organizing web sites visited by a user. Moreover, these features require manual intervention from users. Furthermore, they do not group web sites accessed by a user according to their semantic similarities. They also do not group web sites by a user's frequency of visiting a web site. Consequently, it would be useful to have a solution that addresses the above problems and simplifies web site organization, navigation and selection for a novice as well as an expert user.

The present invention provides a simplified method and system for web site organization, navigation and selection.

Figure 1:
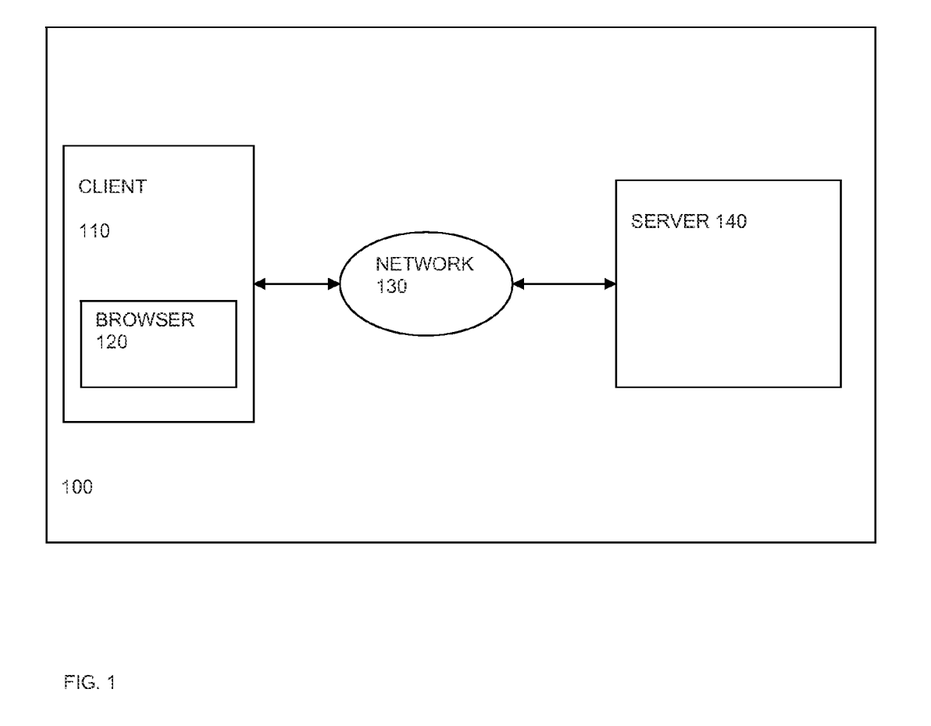
FIG. 1 shows a diagram illustrating a client-server architecture for navigating web sites according to an embodiment.

FIG. 1 shows a diagram illustrating a client-server architecture 100 for navigating web sites according to an embodiment.

The client-server architecture 100 includes a client device 110 and a server 140. Although only a single device 110 and a single server 140 have been illustrated in FIG. 1, it would be appreciated that an embodiment of the invention may be implemented in a multi-client and multi-server architecture. Further, embodiments of the invention may be implemented in other computer architectures as well.

The client device 110 may be any kind of electronic device, such as, but not limited to, a personal computer, a desktop computer, a laptop computer, a notebook computer, a network computer, a personal digital assistant (PDA), a mobile device, a hand-held device, or any other suitable electronic device.

Both the client device 110 and server 140 may include a processor and a memory. These components may be coupled together through a system bus. The memory may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc.

The client device 110 may include, in memory, a web browser 120. A web browser is a computer application that is typically used to access, retrieve and display a web page or a web site. Some of the web browsers that may be used are Internet Explorer, Opera, Mozilla Firefox and Google Chrome.

The server 140 may be any combination of hardware or software designed to provide services to client devices such as client device 110. The server 140 typically runs a server operating system such as, but mot limited to, Windows NT, HP Unix, Sun Solaris and Linux.

In an embodiment, the client device 110 and server 140 are connected together through a network 130. The network may be the internet, an intranet or an extranet. The client device 110 and server 140 may get connected to the network 130 via a wired or wireless connection.

It would be appreciated that the client-server architecture components depicted in FIG. 1 are for the purpose of illustration only and the actual components may vary depending on the computing architecture deployed for implementation of the present invention.

Figure 2:
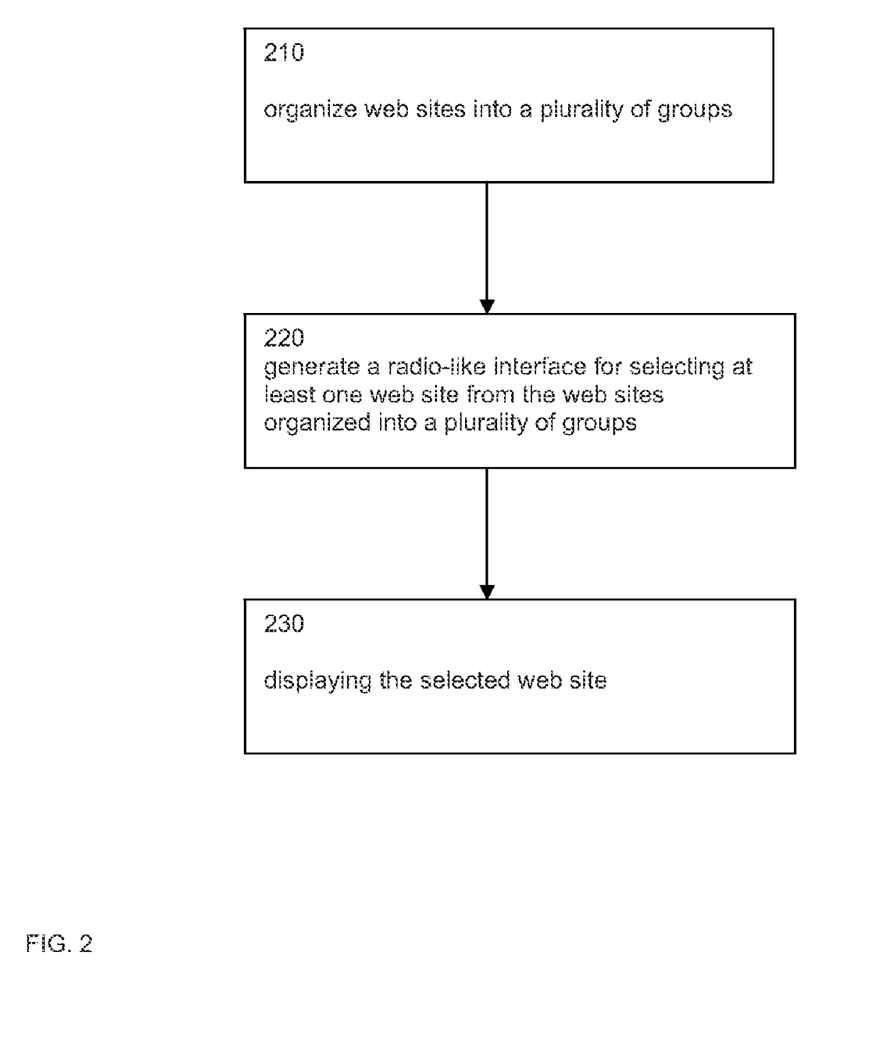
FIG. 2 shows a flow diagram of a method for navigating web sites according to an embodiment.

FIG. 2 shows a flow diagram of a method for navigating web sites according to an embodiment.

Step 210 includes organizing web sites into a plurality of groups. Web sites accessed by a user on a computing device are organized into a number of groups. The websites are grouped together according to different genres. For example, web sites belonging to sports may be grouped together under a SPORTS group, web sites pertaining to stocks may be grouped together under a STOCKS group and web sites providing information related to kids may be grouped together under a KIDS group. These examples are for the purpose of illustration only and any number of groups pertaining to different genres may be created. Further, sub-groups may be created within a group. For example, a KIDS group may have sub-groups, such as, GAMES, FUN, LEARNING and KNOWLEDGE. The groups and sub-groups get generated based on the web sites accessed by a user.

In an embodiment, a user may be provided a user input option to enter the web sites of his or her choice. Based on the genre of web sites added the method organizes the web sites into different groups. In another embodiment, the method scans the web sites accessed by a user from the web history of the user's browser and organizes the web sites into different groups.

In an embodiment, the websites frequented by a user are grouped such that similar websites are close together. To illustrate, different equities-related web sites accessed by a user would be grouped more closely than derivative-related web sites although all of them may be grouped together under a group INVESTMENTS. The similarity computation may be based on the distance between the nodes in a ontology like DMOZ under which the pages are classified. For instance, if a page A is under sports in DMOZ and page B is under politics, the distance between the pages is the number of nodes traversed in getting from A to B in the DMOZ tree. Other ontologies such as Wikipedia may also be used, if two webpage links occur on the same Wikipedia topic page, they can be deemed similar. Finally, pages tagged with the same tag on tagging sites such as de.li.cio.us could also be classified as similar. The similarity between web pages may also be computed in other ways. For instance, one could use standard information retrieval techniques such as the cosine similarity of the TF*IDF vector of the two web pages to assess similarity. One could also assess similarity between two web pages by evaluating the overlap between common words on both web pages. Different statistics such as the Jaccard index or the Dice coefficient could be used to estimate the degree of overlap.

Step 220 includes generating a radio-like interface for selecting at least one web site from the web sites organized into the plurality of groups in step 210. Generating the radio-like interface includes generating one or more radio channel-like element and one or more radio-frequency like element. Each radio channel-like element corresponds to a different group in the plurality of groups and is analogous to the FM, AM channel on a radio. Each radio-frequency like element corresponds to a different web site in the plurality of groups and is analogous to a frequency on a radio channel. For example, one radio-frequency like element may correspond to www.cnbc.com, the second radio-frequency like element may correspond to www.ndtv.com, and the third radio-frequency like element may correspond to www.utv.com. There is no limit to the number of radio-frequency like elements a radio-like interface may have. Also unlike the traditional radio interface where a frequency element appears only in one channel (e.g. FM), the same website may appear under more than one channel if the page is relevant to multiple channels. For instance, a page on Julia Roberts may appear in the channel ACTRESSES and the channel CELEBRITIES. However, each one would correspond to a different web site. The radio-like interface allows a user to navigate the grouping in a manner similar to tuning into radio channels.

In an embodiment, for a user to access a web site that has been grouped into one of the plurality of groups in step 210, the user first selects a group from the plurality of groups using the radio channel-like element of the radio-like interface. For example, in order to access a stock web site in the INVESTMENTS group, a user first selects the INVESTMENTS group using the radio channel-like element. After a group has been selected, the radio frequency-like element is used for selecting a web site within the selected group. In the above example, the radio frequency-like element is used for selecting a stock web site within the INVESTMENTS group.

In an embodiment, the method allows formation of new groups as and when a user accesses new genres of web sites. It also allows a user to manually add a new group of his or her choice. Further, as and when a user visits a new web site, the method updates the existing groups with web sites newly visited by the user, according to their genre. Therefore, the grouping is updated with time to reflect discovery of newer websites as well as the users browsing patterns.

In an embodiment, the method allows automatic and dynamic creation of a group (channel) in response to a user action (search query, visit to a social networking site, reading product reviews) on the client device. For instance, in response to a query "laptop" or the user browsing laptop reviews, a channel may be created with websites of businesses that sell laptops. The ordering of websites in the channel may be based on the price of the product on the websites, the proximity of the physical establishment to the user or the reputation of the website. These temporary channels may be deleted after evidence that the user is no longer interested in that topic.

In an embodiment, upon selection of a group using the radio channel-like element of the radio-like interface, the method may display a user's frequently visited web sites in preference to other web sites for selection by the user. To illustrate, if a user accesses www.cnbc.com more frequently than www.ndtv.com, upon selection of the INVESTMENTS group which houses both the web sites, the www.cnbc.com would be presented for user selection in priority to www.ndtv.com. Of course, the user always has the option to ignore the presented option and select another web site within the group by using the corresponding radio-frequency like element.

In an embodiment, the websites in a group may be ordered by freshness of content appearing on the website (as determined by a timestamp on the web page). This is particularly relevant when this interface is implemented for a web portal, the freshest links on the portal may be given priority for appearing in the channel. Other criteria may also be used to alter the ordering of websites.

Step 230 includes displaying the selected web site. After a user has selected a web site using the radio-like interface, the selected web site is displayed on the computing device. In case the radio-like interface is implemented with a web browser, the selected web site is displayed in the web browser.

Figure 3:
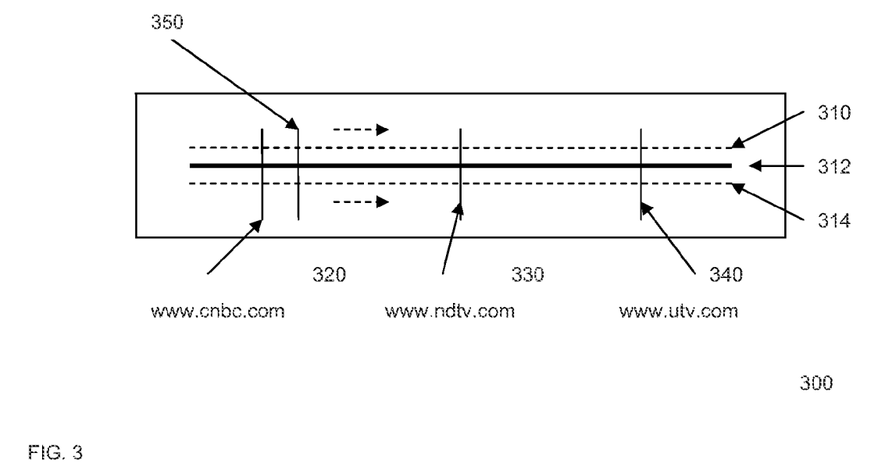
FIG. 3 shows navigation of web sites with an embodiment of a graphical interface according to an embodiment.

FIG. 3 shows navigation of web sites with an embodiment of a graphical interface according to an embodiment. The radio-like graphical interface 300 includes radio channel-like elements 310, 312 and 314, and radio-frequency like elements 320, 330 and 340. As mentioned earlier, the radio channel-like elements 310, 312 and 314 correspond to different groups of web sites and are analogous to the FM, AM channels on a radio. In the present illustration, the radio-channel like element 310 corresponds to a web site group INVESTMENTS, the radio-channel like element 312 corresponds to group KIDS and the radio-channel like element 314 corresponds to group SPORTS. Each radio-frequency like element 320, 330 and 340, corresponds to a different web site and is analogous to a frequency on a radio channel. Based on the selection of a radio-channel like element, the corresponding web site group gets selected. In the present illustration, selection of the radio-channel like element 310 results in the selection of corresponding web site group INVESTMENTS. Once a web site group has been selected, the web sites present within the web site group are displayed to a user for making a selection. The radio-frequency like elements 320, 330 and 340, are used for making that selection. It would be appreciated that the radio-frequency like elements 320, 330 and 340 and their corresponding web sites may vary according to the genre of the selected web site group. For example, in the present illustration, selection of web site group INVESTMENTS presents radio-frequency like elements, which correspond to investment-related web sites. In the present case, the web sites (www.cnbc.com, www.ndtv.com and www.utv.com) within the group INVESTMENTS along with their corresponding radio-frequency like elements (320, 330 and 340, respectively) are presented to a user for making a selection. In case, radio-channel like element 312 is selected, web sites corresponding to group KIDS would be presented for selection. Upon selection, the selected web site gets displayed on a computing device.

It would be appreciated that the number of radio channel-like elements and radio-frequency like elements depicted in FIG. 3 are for the purpose of illustration only and the actual number of components may vary depending upon implementation of the present invention. Similarly, numerous variations in the shape and design of the radio-like interface and its constituent elements are possible. Accordingly, the interface depicted in FIG. 3 is for illustrative purposes only.

In the present illustration, a user selects the radio-channel like element 310, and subsequently a radio-frequency like element 320, 330 or 340. Various means may be employed for interacting with the radio-like interface. For example, a user may use a mouse click, a touch option, a gesture, a computer keypad, etc. for interacting with the graphical interface and its components. Further, a hardware interface, such as, but not limited to, a rotatable knob, may be provided in a computing device to control and operate the radio-like interface. Upon rotation, a user may select a radio-channel like element and a radio-frequency like element analogous to tuning-in to a radio-channel and a radio-frequency, respectively. Turning the knob results in tuning to a different website. As the user changes websites (by moving the hardware interface or software interface) the next website is pre-emptively fetched to make the browsing experience better. In another embodiment, the radio-like interface 300 may be provided in a web browser.

FIG. 3 further illustrates selection of another web site 350 within a web site group. In the present illustration, a user may select another web site (for example, www.ndtv.com) within the group INVESTMENTS by simply employing one or the other means mentioned in the earlier paragraph. This may be through a mouse click, a drag-and-drop option, a gesture, etc.

Figure 4:
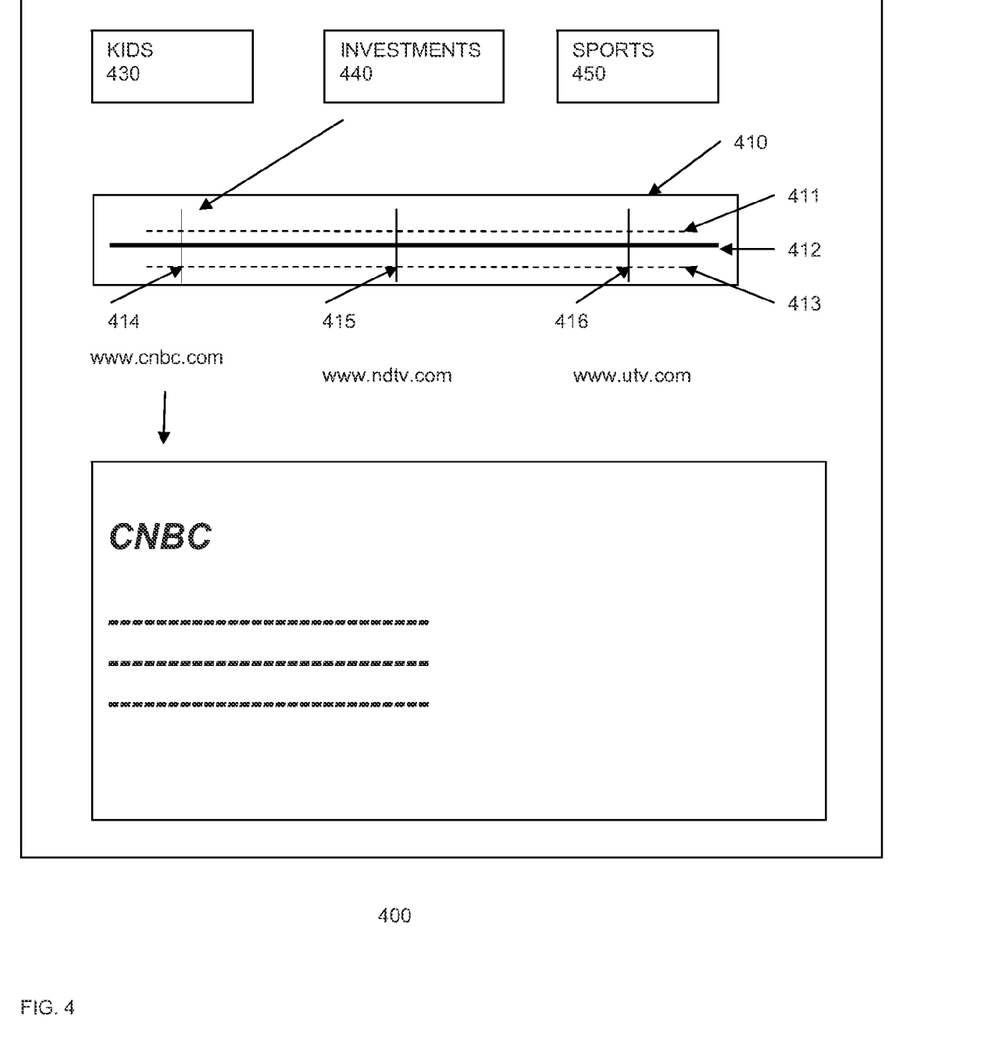
FIGS. 4 and 5 show navigation of web sites in a web browser with an embodiment of a graphical interface according to an embodiment.
Figure 5:
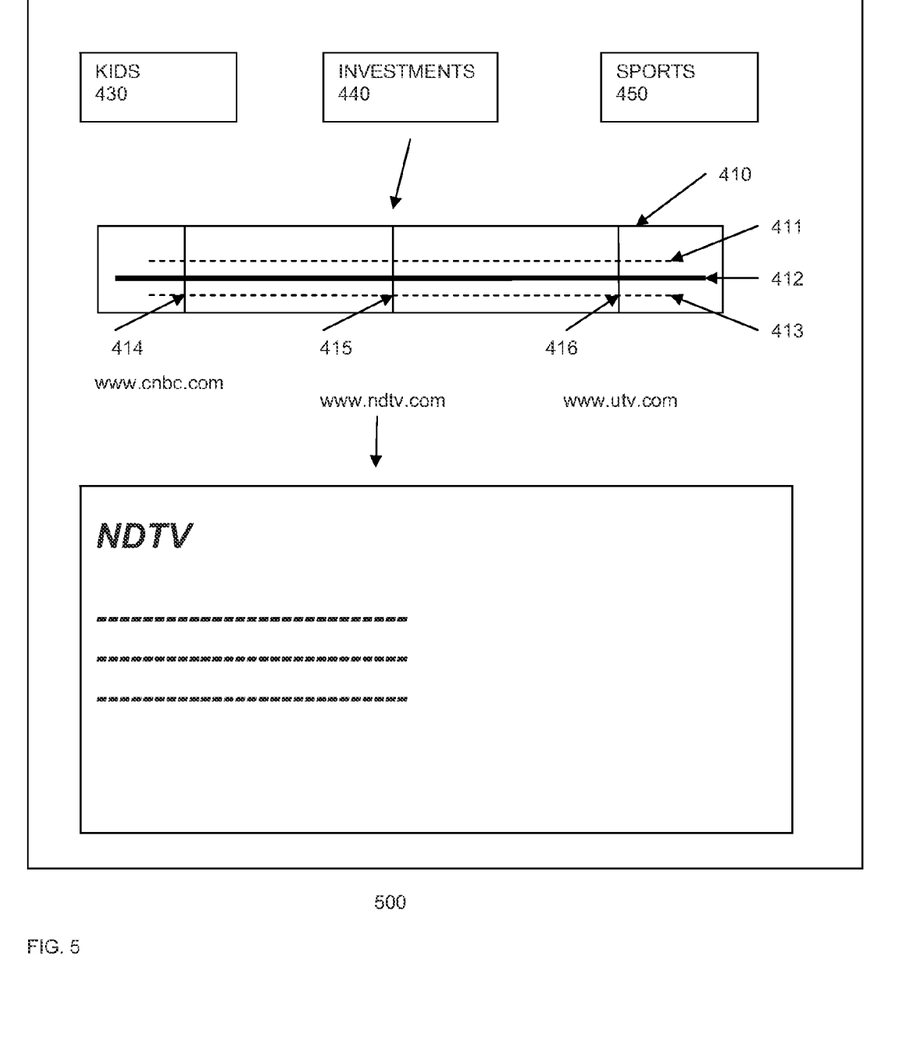

FIGS. 4 and 5 show navigation of web sites in a web browser with an embodiment of a graphical interface according to an embodiment.

FIG. 4 illustrates navigation of web sites in a web browser 400. The web sites accessed by user have been categorized into three groups: KIDS 430, INVESTMENTS 440 and SPORTS 450. Radio-like interface 410 comprises radio-like channels 411, 412 and 413, corresponding to groups, KIDS 430, INVESTMENTS 440 and SPORTS 450, respectively. Upon selection of radio-like channel 412, radio-frequency like elements (414, 415 and 416) and their corresponding web sites (www.cnbc.com, www.ndtv.com and www.utv.com) within the group INVESTMENTS 440 are displayed. In the present illustration, selection of radio-frequency like element 414 displays the corresponding web site www.cnbc.com in the web browser 400.

Along similar lines, FIG. 5 illustrates selection of radio-frequency like element 415 and display of its corresponding web site www.ndtv.com in the web browser 400.

Figure 6:
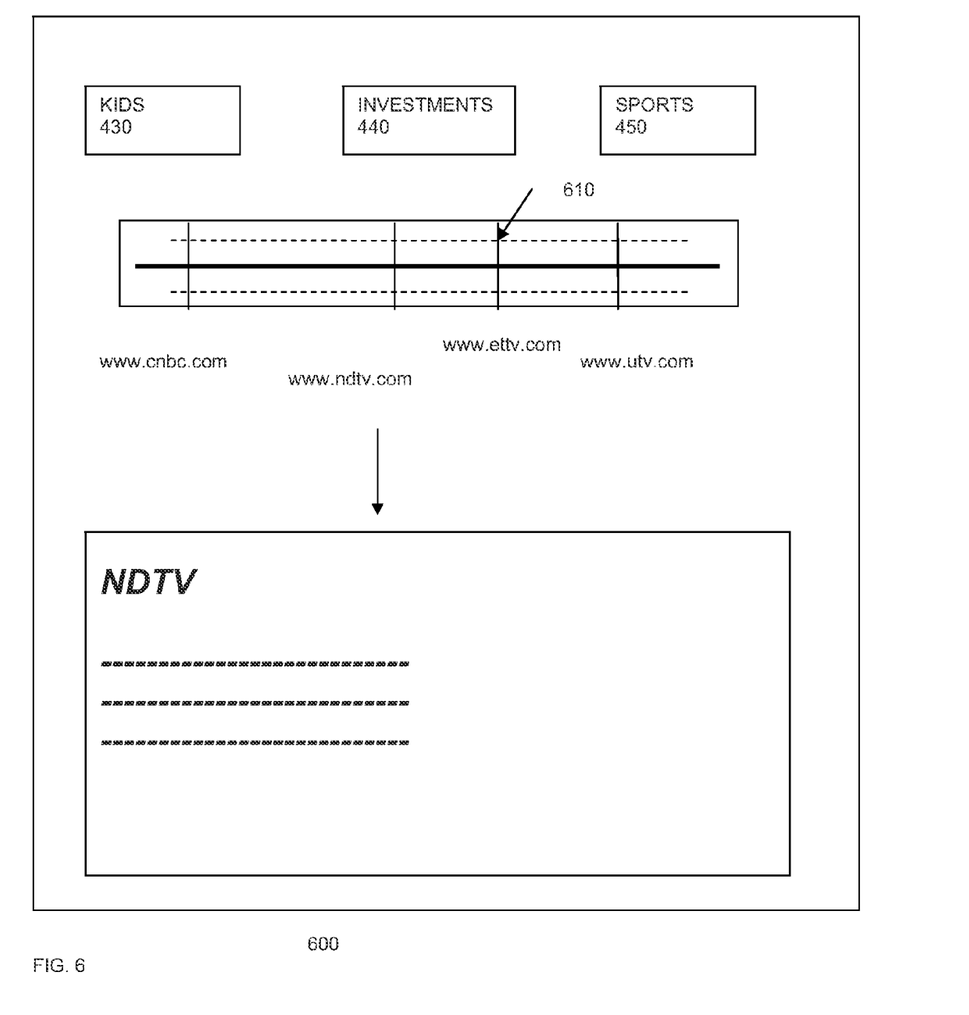
FIG. 6 shows addition and navigation of web sites with an embodiment of a graphical interface in a web browser according to an embodiment.

FIG. 6 shows addition and navigation of web sites in a web browser with an embodiment of a graphical interface according to an embodiment.

FIG. 6 illustrates addition of a newly visited web site (www.ettv.com) within the group INVESTMENTS. As mentioned earlier, when a user visits a new web site, the method updates the existing groups with web sites newly visited by the user, according to their genre. The grouping is updated with time to reflect discovery of newer websites as well as the users browsing patterns. In the present case, the newly visited web site (www.ettv.com) belongs to the genre investments, therefore it has been categorized within the group INVESTMENTS.

New websites may be inserted from time to time (analogous to new radio channels appearing) in the channels. The insertion could be based on discovery of new websites related to the ones in a channel. This discovery may happen because of the users browsing behavior or recommendations from others. The website insertion may also be a paid insertion, for instance a service provider may pay for inserting his website between two sites. The insertion could be for a specific duration or could be tied to the user being at a specific geo-location. Websites may also be removed if users don't use them for a period of time. The location of the new website may be based on its semantic proximity to existing websites. A new website may also be placed close to an existing website if both the websites are accessed together. Users may also be cued to go to specific websites based on their recent web browsing/search activity, these websites may be differently color coded to indicate contextual relevance. Contextual ads may also appear in the interface depending on the user activity.

The above embodiments may be adapted to work on the whole web or in a specific subset of the web (a corporate site, a portal, a blog, etc)

The embodiments described above simplify discovery and navigation of websites, especially for novice users. It allows novice web users to access the web using the familiar metaphor of tuning in to a radio channel. It allows discovery of websites without recourse to search or navigation of ontologies like DMOZ. It also allows newer websites to position themselves before the user based on the relevance to the particular user without getting into the race of improving their positions in a search engine. For portals and other websites, it allows a more intuitive way of navigating the website. It also allows website navigation without typing in a single url.

It will be appreciated that the embodiments within the scope of the present invention may be implemented in the form of a computer program product including computer-executable instructions, such as program code, which may be run on any suitable computing environment in conjunction with a suitable operating system, such as, Microsoft Windows, Linux or UNIX operating system. Embodiments within the scope of the present invention may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present invention is for the purpose of illustration only. Although the invention has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present invention.

The invention claimed is:

1. A computer-implemented method of navigating web sites, the method comprising:
organizing web sites accessed by a user into a plurality of groups; and
generating an interface for selecting at least one web site from the web sites organized into the plurality of groups by generating a plurality of channel elements and a plurality of frequency elements, wherein each of the plurality of channel elements corresponds to a different group in the plurality of groups and each of the plurality of frequency elements corresponds to a different web site in the plurality of groups, wherein each of the plurality of channel elements comprises an associated set of the plurality of frequency elements, wherein the plurality of channel elements are arranged in a vertically aligned manner with respect to each other, wherein each of the plurality of frequency elements are arranged in a horizontally aligned manner with respect to each other in respective ones of the plurality of channel elements, thereby mimicking a plurality of channels and frequencies in a radio interface, and wherein the plurality of frequency elements in each of the respective ones of the plurality of channel elements are arranged in order according to a predefined criteria.

2. A method according to claim 1, further comprising:
receiving a selection of one of the plurality of channel elements; and
displaying the set of the plurality of frequency elements associated with the selected one of the plurality of channel elements.

3. A method according to claim 2, further comprising:
receiving a selection of one of the displayed plurality of frequency elements; and
displaying the web site corresponding to the selected frequency element.

4. A method according to claim 1, further comprising receiving a list of web sites accessed by the user as a user input.

5. A method according to claim 1, wherein the web sites are organized into the plurality of groups according to their genre.

6. A method according to claim 1, further comprising updating the plurality of groups with web sites newly visited by the user.

7. A method according to claim 1, further comprising displaying the user's frequently visited web sites in preference to other web sites for selection by the user.

8. A method according to claim 1, wherein the interface is a software interface.

9. A method according to claim 1, wherein the interface is a hardware interface.

10. A method according to claim 1, wherein the interface is provided in a web browser.

11. A method according to claim 1, wherein the predefined criteria comprises a frequency with which a user visits the web sites, and wherein the plurality of frequency elements in each of the respective ones of the plurality of channel elements are arranged in order according to the frequency with which the user visits the web sites corresponding to the plurality of frequency elements.

12. A method according to claim 1, wherein the predefined criteria comprises a freshness of content appearing on the web sites, and wherein the plurality of frequency elements in each of the respective ones of the plurality of channel elements are arranged in order according to the freshness of the content appearing on the web sites corresponding to the plurality of frequency elements.

13. A system for navigating web sites, the system comprising:
a processor; and
a memory comprising program instructions, wherein the program instructions are executable by the processor to:
organize web sites accessed by a user into a plurality of groups; and
generate an interface for selecting at least one web site from the web sites organized into the plurality of groups, wherein the interface is generated with the plurality of groups arranged as a plurality of channel elements and the plurality of web sites arranged as a plurality of frequency elements, wherein the plurality of channel elements corresponds to a different group in the plurality of groups and each of the plurality of frequency elements corresponds to a different web site in the plurality of groups, wherein each of the plurality of channel elements comprises an associated set of the plurality of frequency elements, wherein the plurality of channel elements are arranged in a vertically aligned manner with respect to each other, wherein each of the plurality of frequency elements are arranged in a horizontally aligned manner with respect to each other in respective ones of the plurality of channel elements, thereby mimicking a plurality of channels and frequencies in a radio interface, and wherein the plurality of frequency elements in each of the respective ones of the plurality of channel elements are arranged in order according to a predefined criteria.

14. The system according to claim 13, wherein the predefined criteria comprises a frequency with which a user visits the web sites, and wherein the plurality of frequency elements in each of the respective ones of the plurality of channel elements are arranged in order according to the frequency with which the user visits the web sites corresponding to the plurality of frequency elements.

15. The system according to claim 13, wherein the predefined criteria comprises a freshness of content appearing on the web sites, and wherein the plurality of frequency elements in each of the respective ones of the plurality of channel elements are arranged in order according to the freshness of the content appearing on the web sites corresponding to the plurality of frequency elements.

16. A non-transitory computer readable medium on which is stored a set of machine readable instructions that when executed by a processor are to perform a method of navigating web sites, said set of machine readable instructions comprising computer readable code to:
organize web sites accessed by a user into a plurality of groups; and
generate an interface for selecting at least one web site from the web sites organized into the plurality of groups by generating a plurality of channel elements and a plurality of frequency elements, wherein each of the plurality of channel elements corresponds to a different group in the plurality of groups and each of the plurality of frequency elements corresponds to a different web site in the plurality of groups, wherein each of the plurality of channel elements comprises an associated set of the plurality of frequency elements, wherein the plurality of channel elements are arranged in a vertically aligned manner with respect to each other, wherein each of the plurality of frequency elements are arranged in a horizontally aligned manner with respect to each other in respective ones of the plurality of channel elements, thereby mimicking a plurality of channels and frequencies in a radio interface, and wherein the plurality of frequency elements in each of the respective ones of the plurality of channel elements are arranged in order according to a predefined criteria.

* * * * *